United States Patent [19]

Ritchie et al.

[11] 3,997,762
[45] Dec. 14, 1976

[54] FIRE CONTROL SYSTEM

[76] Inventors: David Scarth Ritchie; James Gordon Hamilton, both of Caxton St., Anniesland, Glasgow, G13 1HZ, Scotland; Alexander James Martin, Procurement Executive, Ministry of Defence, London S.W.1., England

[22] Filed: Oct. 6, 1975

[21] Appl. No.: 620,200

[30] Foreign Application Priority Data

Oct. 9, 1974  United Kingdom ............. 43668/74
Nov. 16, 1974  United Kingdom ............. 49816/74

[52] U.S. Cl. .......................... 235/61.5 R; 33/235; 353/12
[51] Int. Cl.² ....................................... G06F 15/58
[58] Field of Search ................ 235/61.5 R, 61.5 E, 235/61.5 DF, 61.5 S; 33/235, 237; 73/167; 353/12

[56] References Cited

UNITED STATES PATENTS

| | | | |
|---|---|---|---|
| 2,960,906 | 11/1960 | Fogel | 353/12 X |
| 3,309,963 | 3/1967 | Salomonsson | 235/61.5 E X |
| 3,339,457 | 9/1967 | Pun | 235/61.5 R X |
| 3,694,095 | 9/1972 | Louthan | 33/235 X |

*Primary Examiner*—Jerry Smith
*Attorney, Agent, or Firm*—Mason, Fenwick & Lawrence

[57] ABSTRACT

A Tank fire control system is disclosed which includes a sighting device having a visual display on which a plurality of images are presented in superimposition. The first image is formed from radiation in the visible spectrum emanating from the field view, a second image is defined by a target aiming mark and a third image is formed from radiation in the infrared spectrum emanating from the same field of view and the field of view is adjustable by operator action.

8 Claims, 10 Drawing Figures

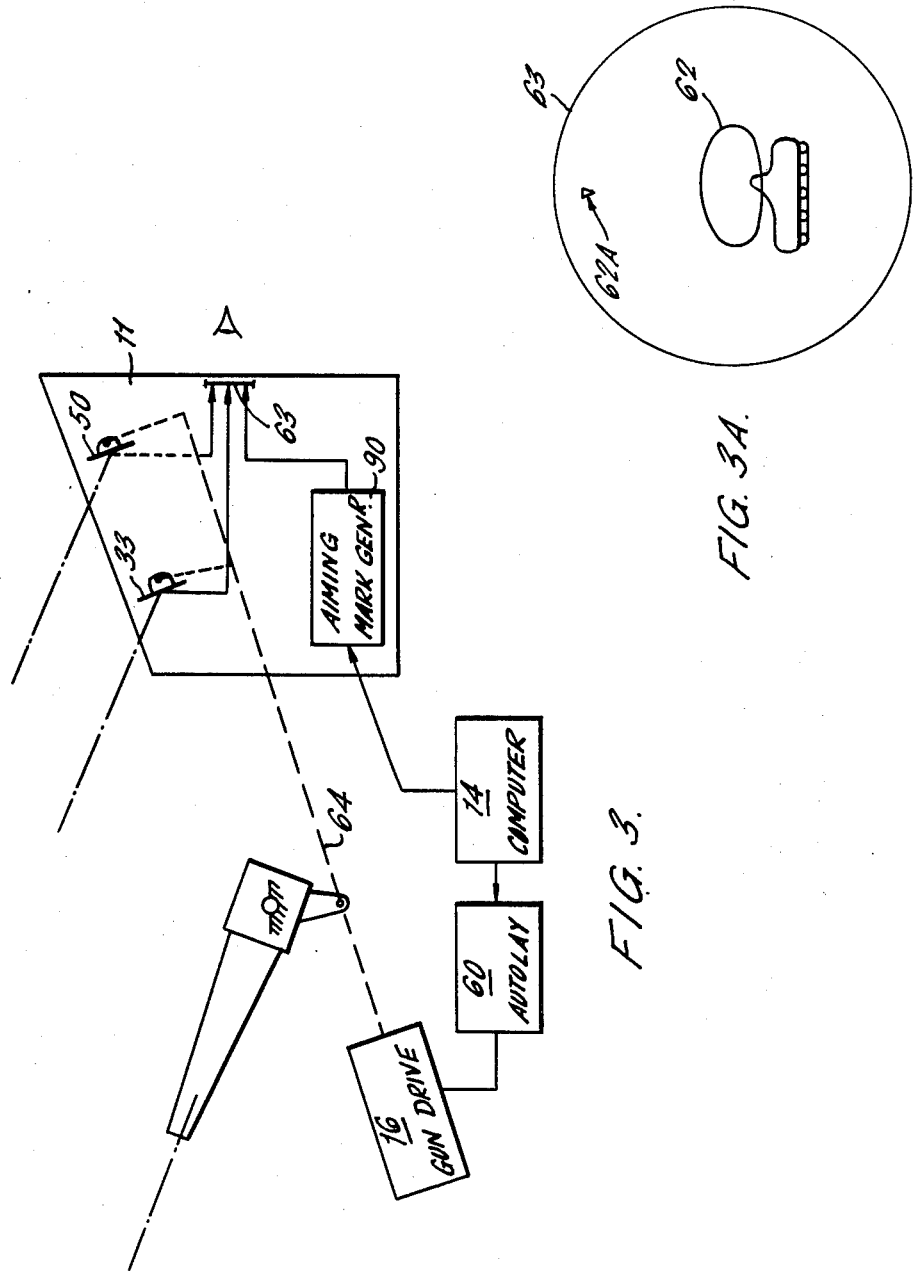

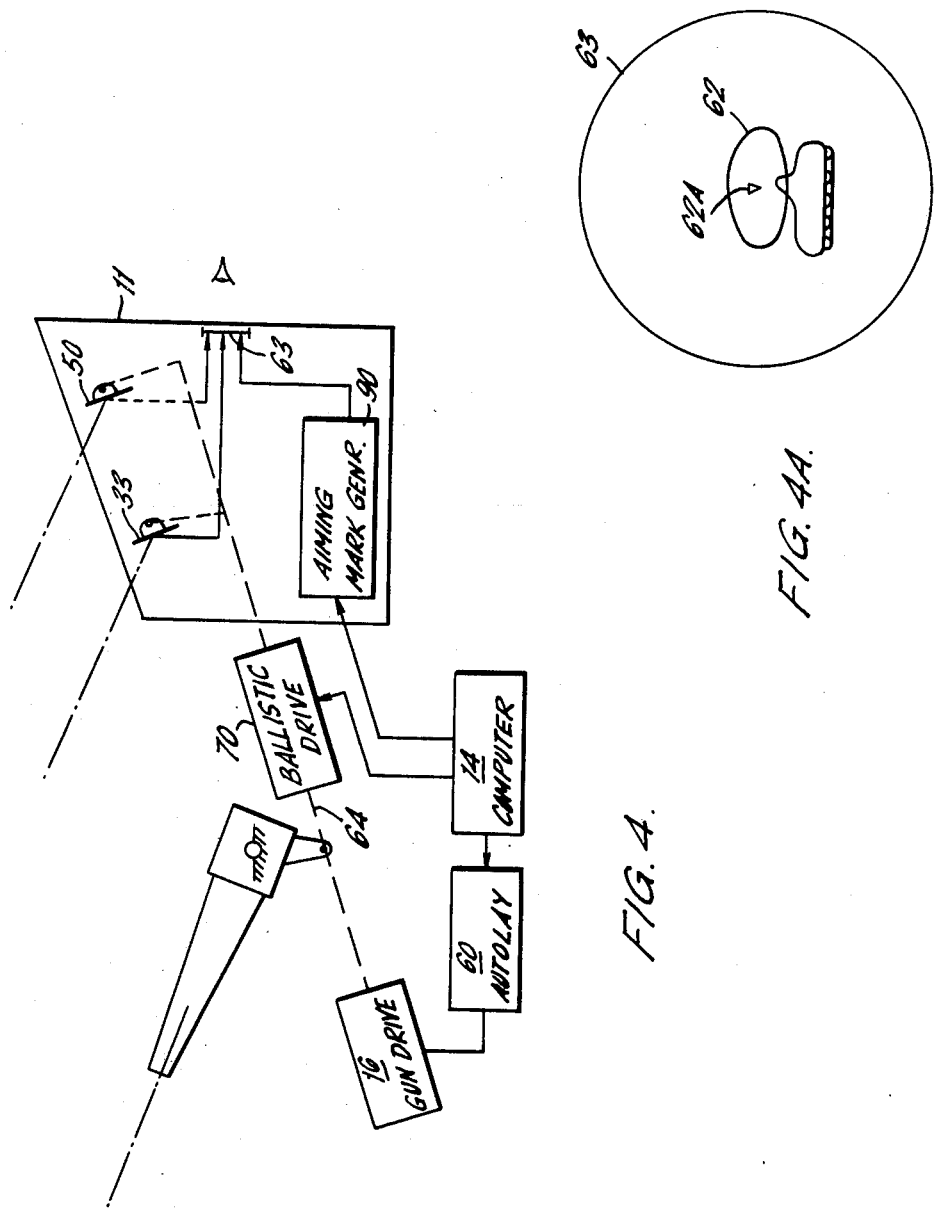

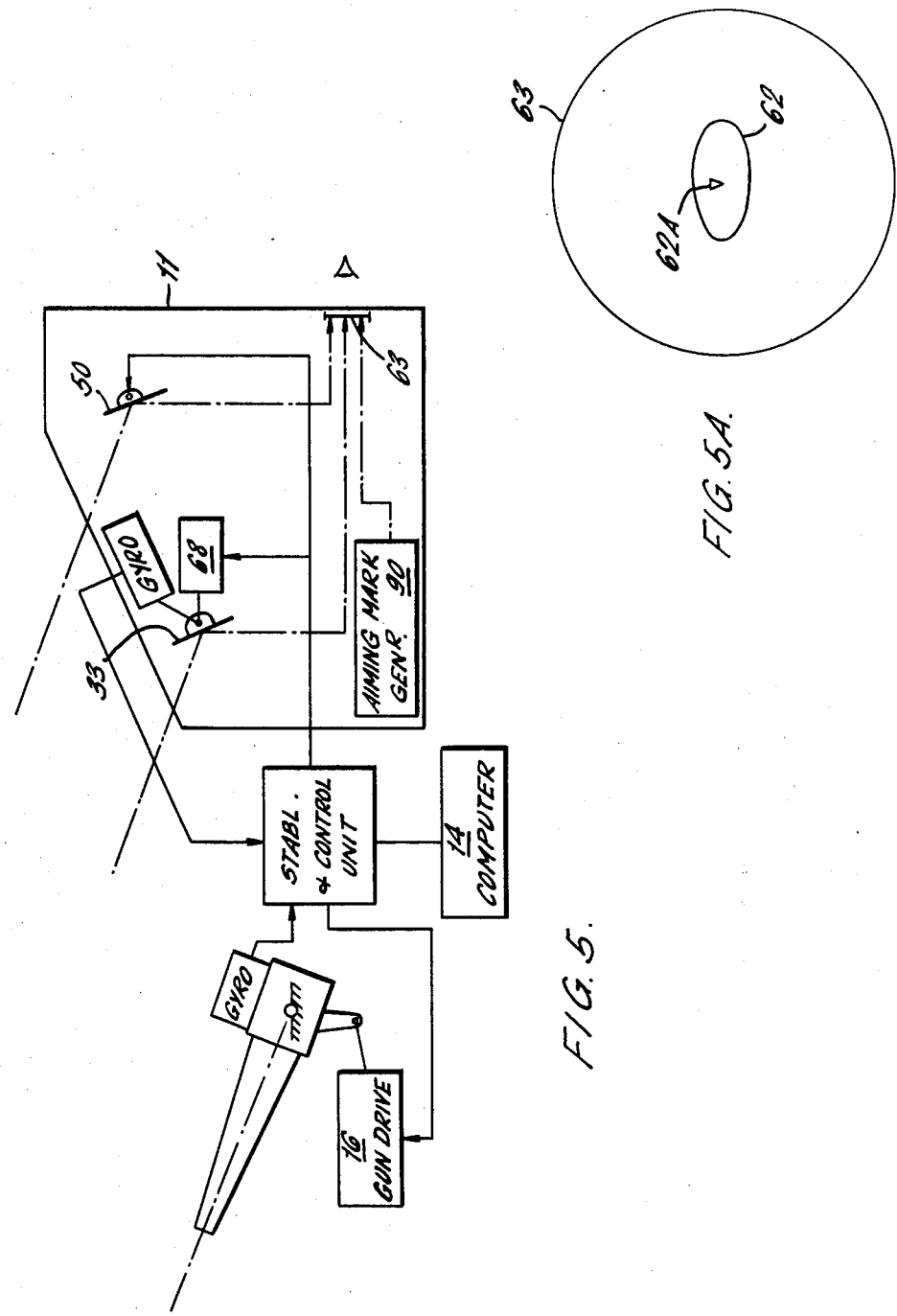

FIRE CONTROL SYSTEM

This invention relates to a fire control system for a gun.

According to the present invention there is provided a fire control system for a gun, said system comprising target position determining means, a computer adapted to receive signals representative of ballistic parameters and to receive from said position-determining means signals representative of target position and arranged to compute fire control signals therefrom, and a gun drive mechanism coupled to receive said fire control signals, and wherein said target position determining means includes a sighting device having a visual display on which first, second and third images are presented in superimposition, said first image being formed from radiation in the visible spectrum emanating from a field of view, said second image being defined by a target aiming mark, and said third image being formed from radiation in the infrared spectrum emanating from said field of view, said target position determining means including a manually-controllable element for altering said field of view.

Conveniently said visual display may incorporate additional images in superimposition with said first, second and third images, said additional images may be formed from radiation in any part of the electromagnetic spectrum, for example, ultra-violet or x-ray.

Different embodiments of the present invention and modifications to said embodiments will now be described by way of example with reference to the accompanying drawings, in which.

FIGS. 3, 4 and 5 schematically illustrate three different embodiments of the present invention;

FIGS. 3A, 4A and 5A are useful in understanding the operation of respective embodiments;

FIG. 6 is a block diagram of a still further arrangement; and

Figure 7:
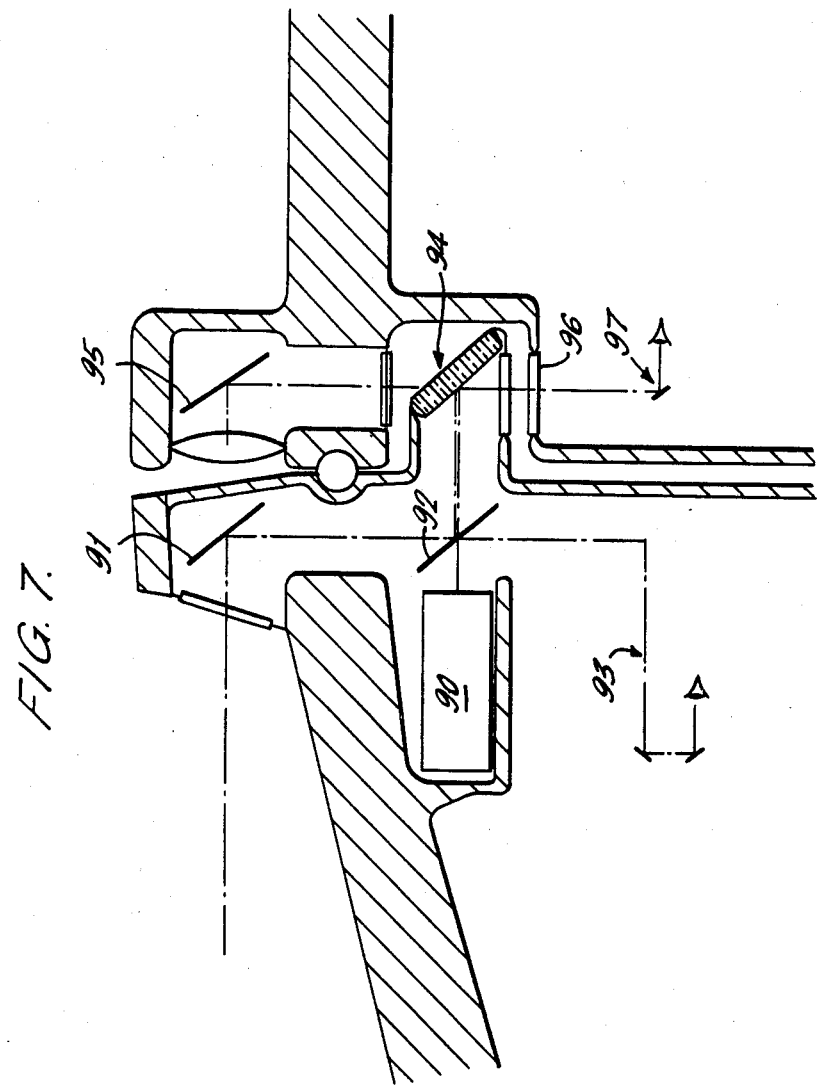

FIG. 7 illustrates a detail of a modified arrangement.

Figure 1:
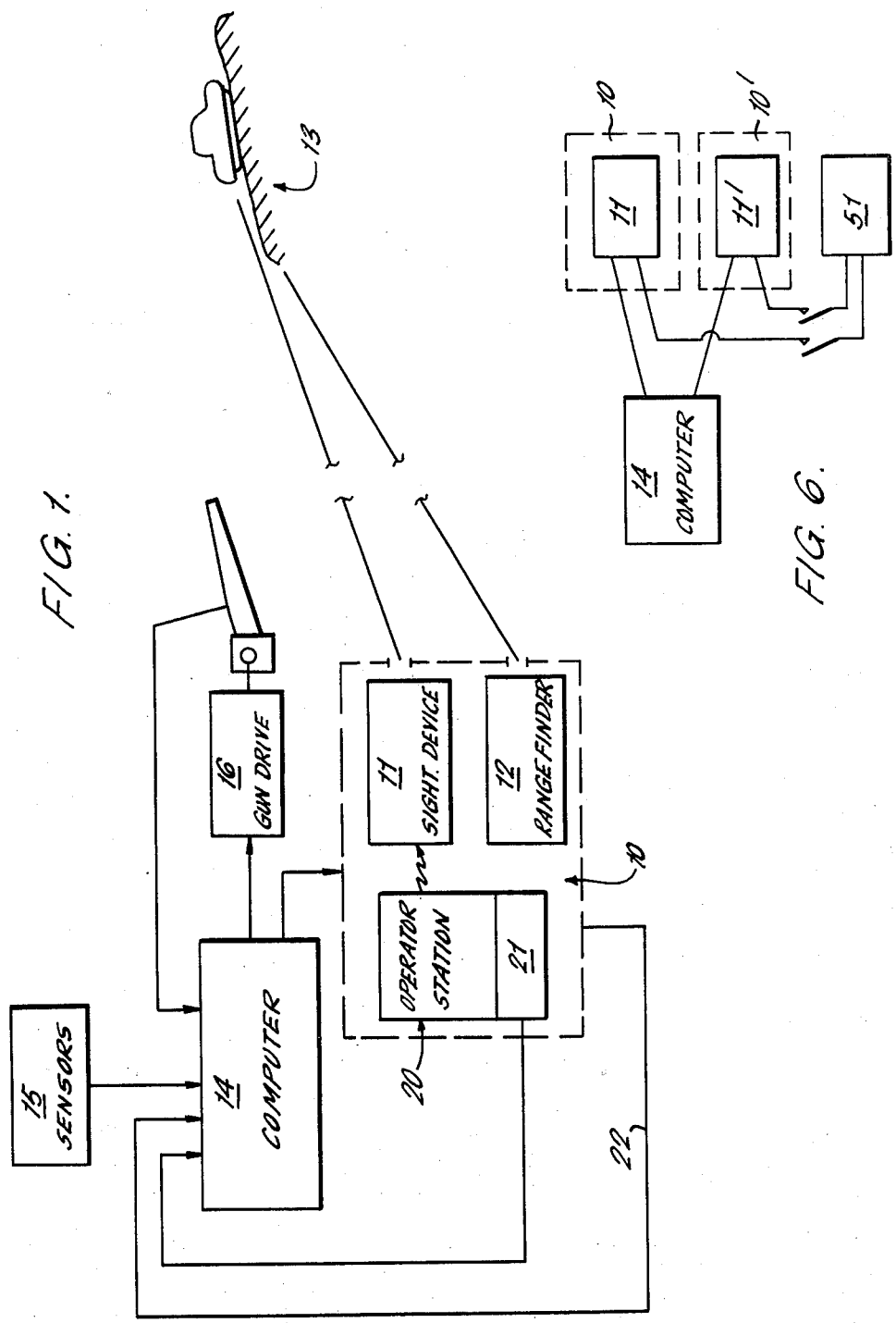
FIG. 1 is a block diagram showing the general organisation of a fire control system.

In the fire control system of FIG. 1 there is a target position determining means or monitoring station 10 which incorporates a sighting device 11 and a ranging device 12 both of which are arranged to survey a target scene 13. A computer 14 receives input signals representative of environmental parameters such as air temperature, barometric pressure, wind direction and velocity, compass heading and gravity from sensors 15 and signals representative of ballistic parameters such as charge temperature, type of ammunition selected and gun barrel bending are also fed to the computer 14 which in accordance with a predetermined program computes fire control signals and applies these signals to a gun drive mechanism 16.

The sighting device 11 includes a visual display which will be described in detail hereinafter and which is witnessed by an operator at a station 20 where a manually controllable element 21 is provided which when actuated causes alteration of the field of view of the sighting device 11. The means 10 is also coupled by a link 22 to the computer 14 in order to provide signals representative of target position.

Figure 2:
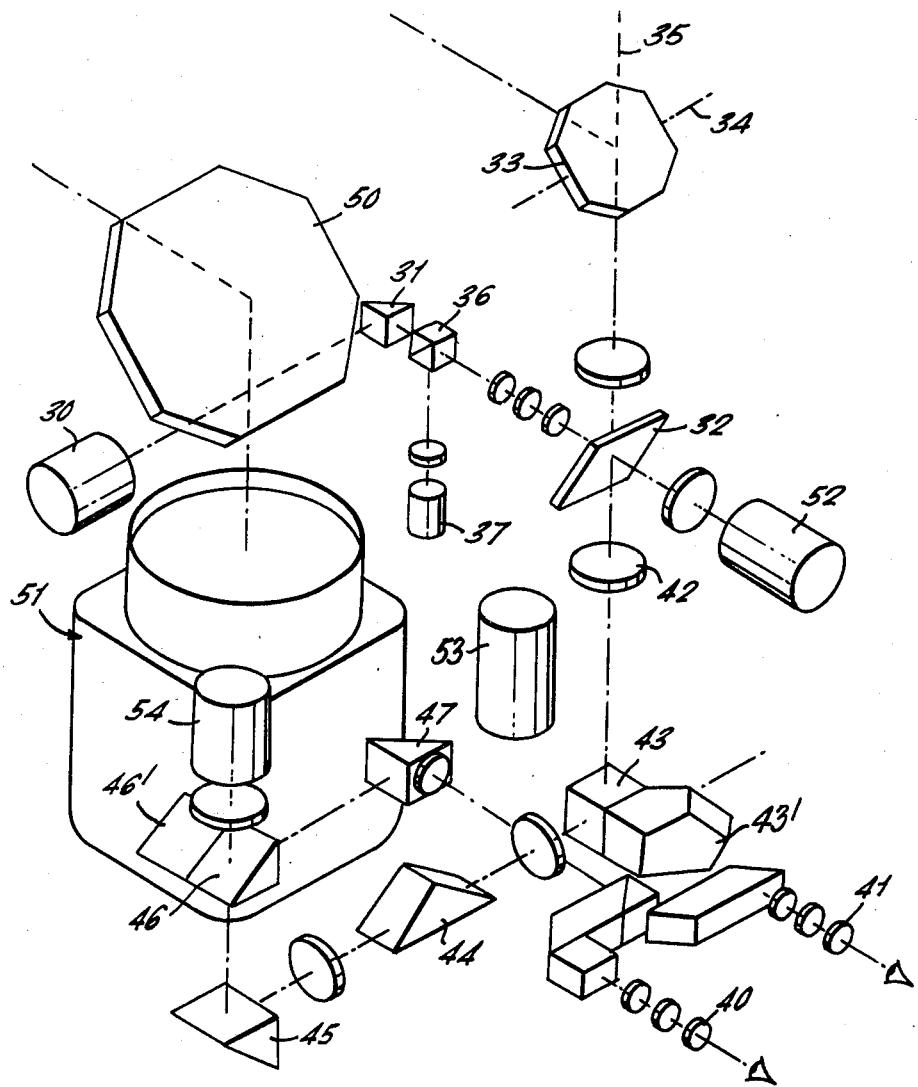
FIG. 2 illustrates one form of sighting device which can be used in the present invention.

The sighting device 11 and the ranging device 12 of FIG. 1 are shown in greater detail in FIG. 2. The ranging device 12, in this embodiment is in the form of a laser range-finder which incorporates a laser 30 the output beam of which is reflected by elements 31, 32 and 33 to be transmitted through space towards a target located in the field of view of the element 33 which is a plane mirror pivotable about a transverse axis 34 and rotatable in azimuth about a vertical axis 35. Reflected laser radiation is directed by the elements 33 and 32 to a beamsplitter 36 which directs the reflected laser radiation to a detector 37 which is coupled to calculating circuit (not shown) to determine the range of the target in known manner. The laser rangefinder described in U.K. patent specification No. 1,314,720 could be used to form the device 12.

Radiation of visible wavelength emanating from the aforesaid field of view is reflected by the mirror 33 through the element 32 to form part of a visual display for an operator. The display is presented at eyepieces 40, 41 which biocularly present the image of the field of view emanating from the mirror 32 in superimposition with the image of a graticule 42 after having been relayed through elements 43, 44, 45, 46 and 47. Elements 43, 35, 46 and 47 are prism reflectors and element 44 is an image rotation element (such as a Dove or Péchan prism) being included for the correction of image rotation caused by azimuth rotation of the mirror 33 relative to the remainder of the sighting device.

The sighting device also includes a means of obtaining an image of the field of view derived from the infrared radiation emanating therefrom and in the arrangement of FIG. 2 this is in the form of an IR-reflective mirror 50 which is mechanically coupled to the mirror 33 and a radiation scanning device 51 which conveniently is in the form described in U.K. patent specification No. 1,328,128. The output of the device 51 is fed by a signal path (not shown) to a visible image generating device 52 which is arranged relative to the element 32 to superimpose the image so generated on the previously described images so that the visual display which is viewed by the operator is a composite of three distinct images.

In the event that the visible radiation is insufficient to provide a distinct image utilising the above described optical elements an image intensifier 53 may be incorporated. To compensate for the changed image plane due to the intensifier 53 the light path between the output from the intensifier 53 and the relay lens preceding element 44 requires to be increased and this may be achieved conveniently by replacing the prism reflector 43 with a roof-edge pentagonal prism 43'.

The mirrors 33, 50 although shown as being separate elements may in fact be monolithic but preferably they are stabilised to maintain the line of sight without interruption by vibration or the like of the housing in which the components of FIG. 2 are located. Conveniently the stabilisation is described in U.K. patent specifications Nos. 1,240,552 or 1,319,307.

The graticule 42 is one way in which an aiming mark and a bore sight mark may be provided but alternatively these may be provided on an image generating device such as a CRT, which could be the generator 52 mentioned above, and in this case the dimensions of the aiming mark may be varied as a function of the range of the target as determined by the ranging device 12 and the location of the aiming and bore sight marks may be determined from the aforementioned ballistic parameters. Conveniently, the aiming mark referred to takes the shape of a circle or ellipse. In the case where an ellipse is used it is necessary to rotate the ellipse in relation to azimuth rotation of the mirror 33 and this may be achieved either electronically when a CRT is used or simply by physically rotating the CRT deflection coils around the tube when a separate CRT is used. The bore sight mark is conveniently a small triangle.

If it is desired to relay the composite image of the visual display to a second monitoring station (not shown) the prism reflector 46 may be replaced by a prism beamsplitter 46' which permits the composite image to be viewed by a camera tube 54 forming part of a television system. Alternatively, as is diagrammatically illustrated in FIG. 6 a composite image may be formed at a second monitoring station 10' by providing each monitoring station 10, 10' with an optical sighting device 11, 11', incorporating means for generating an aiming mark by feeding signals from the computer 14 to the stations 10, 10' to locate the generated aiming marks with respect to the images created by visual radiation within the respective sighting devices, and by generating a visual image from the infrared radiation received by a scanning device 51 and injecting that visual image into each station 10, 10'. If so desired the visual image derived from the infrared radiation may be selectively injected into either station 10, 10'.

Turning now to FIGS. 3 and 3A the sighting device 11 is driven from the gun drive mechanism 16 through a mechanical or electrical connection 64 and therefore the firing ability is restricted because the field of view containing the gun bore sight mark 62A requires to encompass the target at all times if the target to be fired at is to remain visible on the visual display 63. The computer 14 in this case produces fire control signals to actuate the mechanism 16 through an autolay device 60 and simultaneously the aiming mark 62 produced by a generating means and appearing in the visual display 63, is displaced by corresponding signals to become offset in azimuth and in elevation from the gun bore sight mark 62A which is located in a fixed position on the display 63. The aiming mark 62 is controlled in dimension by the computer 14 as a function of the target range (as determined by the laser rangefinder) and conveniently, the mark 62A is located adjacent the edge of the display 63 immediately above the centre thereof.

In FIGS. 4 and 4A the sighting device 11 incorporates a visual display 63 wherein the aiming mark 62 remains at all times centered at the centre of the display although it is controlled in dimension by the computer 14 in accordance with target range. The gun drive mechanism 16 is coupled to drive the gun and the sighting device 11 and additionally the computer 14 actuates the autolay 60 and, in the opposite sense, a ballistic drive 70 to cause the gun to be rotated in azimuth and in elevation in relation to the computed fire control signals.

In FIGS. 5 and 5A the gun drive mechanism 16 is independent of the sighting device drive mechanism 68 and both utilise a gyro reference signal. The computer 14 is coupled to both mechanisms 16 and 68 and the gun is driven in azimuth and in elevation in relation to the computed fire control signals. The visual display 63 in this case appears in the form shown in FIG. 5A having the aiming mark 62 centred therein.

In the event that a monitoring station is to be used for gunlaying purposes with the facility to search unencumbered by the gun, the aiming mark generating means may be fixed to the gun, and operated optically to generate a mark at infinity so that this mark is visible through the afocal sighting device of the monitoring station whenever it is nominally looking in the same direction as the gun is pointing. One such arrangement for achieving this is shown in FIG. 7, where the aiming mark generator 90 is fixedly mounted in a gun turret forming part of a first monitoring station having a first sighting mirror 91, a beamsplitter 92 and an eyepiece system 93. In addition to the combined image received by the eyepiece system 93 the beamsplitter provides a combined image which is incident upon a reflector 94. The monitoring station which is rotatable independently of the gun includes a sighting mirror 95, an objective lens 96 and an eyepiece system 97 and the arrangement is such that when this station is in nominal alignment with the gun the line of sight between the mirror 95 and the lens 96 is intercepted by the reflector 94 and consequently the view in the eyepiece system 97 is the same as that in the system 93.

The arrangement of FIG. 3 could be modified to embody the principles of FIG. 7 by fixedly securing the aiming mark generator with respect to the gun. Alternatively, the sight, including the aiming mark generator, may be related to the gun through optical angle encoders such as, for example, those described in N.E.L. report No. 233 or, by electric synchros in known manner or, by precision mechanical link on its own, or in combination with any of the foregoing.

The computer 14 may be either analogue or digital or hybrid or any convenient type and conveniently is arranged to provide fire control signals which enable the gun to be fired from either a moving or stationary platform to a moving or stationary target. In this case the programming of the computer (either analogue or digital or hybrid) may be in accordance with the equations of motion derived in the book "New Methods in Exterior Ballistics" by F. R. Moulton. One particular form of computer is described in U.K. patent specification No. 1,285,722.

The target position determining means of the present invention may include a radar device the output of which is coupled to the computer in order to provide a fourth image on the display 63 and additionally a daylight T.V. camera could be used to provide a still further image. Also, although image generators in the form of CRT's have been discussed liquid crystal devices or light emitting diode devices which are known in the art could be used. Likewise although a scanning type thermal imager 51 has been described in detail a pyro-electric videcon or other device responsive to electromagnetic radiation could be used or a thermal pointer could be used. It will be understood that the housing containing the sighting device requires to have a window or two separate windows which are respectively transparent to radiation of visible and infrared wavelengths. Where the thermal imaging or other device utilises a raster or other form of scan presentation the superimposition of the graticule image can be carried out by video mixing or by interlaced scans when the graticule image is itself generated using a raster or other form of scan.

What is claimed is:

1. A fire control system for a gun, said system comprising target position determining means, a computer adapted to receive signals representative of ballistic parameters and to receive from said position-determining means signals representative of target position and arranged to compute fire control signals therefrom, and a gun drive mechanism coupled to receive said fire control signals, and wherein said target position determining means includes a sighting device having a visual display on which first, second and third images are presented in super-imposition, said first image being formed from radiation in the visible spectrum emanating from a field of view, said second image being defined by a target aiming mark, and said third image being formed from radiation in the infrared spectrum emanating from said field of view, said target position determining means including a manually-controllable element for altering said field of view.

2. A fire control system according to claim 1, wherein said target-position determining means includes a ranging device and said target aiming mark is controlled in size in accordance with target range.

3. A fire control system according to claim 2, wherein said ranging device is a laser rangefinder.

4. A fire control system according to claim 1, wherein said target aiming mark is adjustable in position on said visual display and is adjusted in position by said fire control signals.

5. A fire control system according to claim 1, wherein the sight line of said sighting device can be aligned with respect to the gun.

6. A fire control system according to claim 5, wherein said alignment is effected by means of an aiming mark generator.

7. A fire control system according to claim 1 wherein said target aiming mark is fixed in position on said visual display.

8. A fire control system according to claim 1 wherein at least one additional visual display is provided in which said first, second and third images are presented in super-imposition.

* * * * *